United States Patent [19]
Bissell, II

[11] Patent Number: 5,253,758
[45] Date of Patent: Oct. 19, 1993

[54] STACKABLE COOKWARE

[76] Inventor: Irving J. Bissell, II, 1731 SE. 15th St., No. 505, Fort Lauderdale, Fla. 33316

[21] Appl. No.: 963,682

[22] Filed: Oct. 1, 1992

[51] Int. Cl.$^5$ ............................................. B65D 21/02
[52] U.S. Cl. .................................. 206/518; 206/515; 206/508; 220/380; 220/212; 220/912
[58] Field of Search ................ 99/426; 220/744, 212, 220/23.83, 23.86, 4.26, 574, 635, 630, 636, 729, 731, 380, 912; 206/501, 502, 503, 505, 508, 509, 511, 518, 519, 520, 821, 515

[56] References Cited

U.S. PATENT DOCUMENTS

| | | | |
|---|---|---|---|
| 2,980,280 | 4/1961 | Herlow | 220/23.83 |
| 4,161,252 | 7/1979 | Howells | 206/508 |
| 4,204,609 | 5/1980 | Kuhn | 206/508 |
| 4,580,680 | 4/1986 | Wind | 206/511 |
| 4,733,790 | 3/1988 | Stein | 220/23.83 |
| 4,742,933 | 5/1988 | Panick | 220/630 |
| 4,951,832 | 8/1990 | Tenney et al. | 220/212 |
| 5,048,688 | 9/1991 | Hicks, Jr. | 206/821 |
| 5,184,745 | 2/1993 | Havens et al. | 220/23.83 |

Primary Examiner—Allan N. Shoap
Assistant Examiner—S. Castellano
Attorney, Agent, or Firm—Malin, Haley, DiMaggio & Crosby

[57] ABSTRACT

A stackable device is disclosed comprising a cooking vessel with tapered sidewalls, lid halves and a handle, whereby the lid halves slidably mount to the cookware vessel and contain apertures for draining and pouring excess liquid therefrom, and whereby the lid halves contain locking channels which interlock and mate with stacking leg projections depending downwardly from the bottom surface. Whereby once the lid halves are attached to the projections of the bottom surface, one unit may be placed within the cavity of another unit for stacking to accommodate convenient packaging, storage and display. In addition, by attaching the lid halves to the bottom surface of the cooking container, lids are prevented from being lost.

16 Claims, 2 Drawing Sheets

STACKABLE COOKWARE

BACKGROUND OF THE INVENTION

1. Field of the Invention

This invention relates generally to cookware and more particularly, to a cooking container having legs depending from its bottom surface to simultaneously facilitate the stacking of numerous such containers and for attachment of the container lids to such depending legs.

2. Description of the Prior Art

Conventional cookware is generally composed of a container having vertical sidewalls extending upwardly from a bottom surface, an elongated handle, and a cover. Cooking vessels of this type, however, are well known to be inadequate for stacking, storing and packaging, and have several related shortcomings, other than unattractive displays and cabinets, which ultimately affect the consumer.

Cookware to date has associated costs, that if reduced, could produce savings to the consumer and manufacturer. Packaging expenses, for one, are higher than necessary because each cookware piece requires individual protection from breaking. Therefore, dividers, fillers and adhesives must be inserted to secure lids and containers that would otherwise be loose. Such custom made boxes, although more expensive, often provide the only means for safe packaging. Likewise, shipping costs are excessive, in that an inordinate number of boxes are required when making shipments to compensate for valuable space wasted in packaging. Furthermore, typical cookware presents an awkward construction for purposes of storage and display, both domestically and commercially, making it difficult to maintain cookware sets without losing lids or other components which must then be replaced. The foregoing expenses are particularly relevant when considering it is the retail consumer that must bear the overhead costs through markups, therefore any reduction in these overhead costs results in realized savings in the purchase price to the consumer.

The prior art teaches a variety of cookware that has resolved unrelated problems while leaving the present needs unfulfilled. For instance, U.S. Pat. No. 4,222,493, issued to Friedman, describes cookware that is adjustable for depth. An additional structure, issued to Paul and disclosed in U.S. Pat. No. 4,936,450, is directed to a custom shipping and display container which supports pans while presenting them in a display. However, the prior art fails to teach of providing cookware which minimizes the space required when storing and shipping such cookware and the problems such cookware would resolve, i.e. packaging and shipping costs. Therefore, there still exists a need for such cookware.

The present invention overcomes the aforementioned problems by providing stackable cookware having tapered sidewalls for mating a pair of self-contained lids, pending legs, and a non-obstructing handle, all of which facilitate the stacking of numerous containers to reduce the cost of shipping and packaging. This stackable cookware design eliminates the need for custom made boxes and additional packaging material, while substantially increasing the number of containers that can be packed in a typical box. In addition, the present invention provides cookware that is better suited for storage in cabinets and display in retail outlets. Since no design has ever been submitted for stackable cookware, this patentable invention is submitted as novel, useful, and unobvious.

SUMMARY OF THE INVENTION

The present invention provides cookware that is stackable for convenient shipping, storage and display. The stackable cookware comprises a bottom surface, tapered sidewalls, stacking legs, attachable lids, and a handle. The bottom surface and sidewalls can be integrally combined and define the cavity of the cookware vessel. Substantial space is normally wasted in cookware cavities during packaging, therefore, this unit is designed to facilitate the stacking of numerous vessels by utilizing the cavity volumes. As a result, ample space is conserved, the number of units packaged is increased considerably, and packing is tighter without additional packaging material.

The sidewalls are tapered, wherein the walls diverge upwardly from the bottom surface to define an open top end. This outward slant in the walls allows one vessel to fit within the cavity of another providing the stacking capability of the cookware. The periphery of the open top end is further defined by a slightly protruding ledge or lip. This lip provides a track for guiding, latching, and attaching the lids.

The lid is comprised of two halves, wherein each half has a substantially planar surface, integrally formed sleeves at its two outer ends, and a plurality of apertures. The sleeves slidably mount to the lip or track of the cooking vessel, securedly attaching the lids thereto. The lid halves are not intended to be sealable, but rather provide lid covers to prevent splashing and splattering during cooking. The apertures penetrating the lid accommodate the pouring and draining of liquid from the contents of the cookware unit when the lids are attached. Each lid half is also comprised of a set of apertures which are more appropriately termed locking channels. These locking channels accommodate lid attachment to the stacking feet or legs which depend from the bottom surface of the vessel.

Externally disposed on the bottom surface are tapered leg projections which facilitate secure attachment of the lid halves during stacking or storing. The legs are positioned to align with the locking channels of each lid half when rotated 90 degrees. When each lid half is aligned with the bottom surface projections, the stacking legs interlock and mate with the locking channels to firmly hold the lids in place. Thus, the lids mount to the leg projections for stacking, packing, or storing without requiring additional space.

The handle design of the cookware also accommodates stacking. The handle is comprised of a planar top surface, a plurality of longitudinally disposed ribs pending from the bottom of the handle and an aperture therethrough for hanging. The ribs offer a firm grip and act as a heat sink to quickly cool the handle. Furthermore, the handle has a low profile design that is meant to enhance rather than obstruct stacking.

In a first mode of operation, the sleeves of the lid halves are joined with the cooking vessel by sliding the sleeves over the protruding lips at opposite ends of the vessel. In this position, the cookware may be utilized for cooking, and the apertures may be utilized for draining any desired liquid contained within the cavity.

In a second mode of operation, the lids are removed and each lid half is rotated 90 degrees to align the locking channels with the bottom surface leg projections.

Each lid half is then independently attached to the bottom surface by inserting the leg projections into the locking channels to interlock and attach the lids. Once the lid halves are attached to the bottom surface, the cookware may be aligned and inserted into the cavity of another unit for stacking and repeated several times, accommodating numerous vessels. In the same manner, cookware may be detached from its stack and used accordingly.

In accordance with the present invention, it is an object hereof to provide cookware that is easily stacked for storage, packaging and display.

An additional object of the instant invention is to provide stackable cookware that conserves packaging space to reduce packaging and shipping costs.

Still an additional object of the instant invention is to provide stackable cookware that is simple in design and low in cost.

Another object of the instant invention is to provide stackable cookware that provides for lid attachment without requiring additional space.

A further object of the instant invention is to provide stackable cookware that is dishwasher safe.

Still a further object of the instant invention is to provide stackable cookware that is microwavable.

In accordance with these and other objects which will be apparent hereinafter, the instant invention will now become described with particular reference to the accompanying drawings.

DESCRIPTION OF THE PREFERRED EMBODIMENTS

Figure 1:
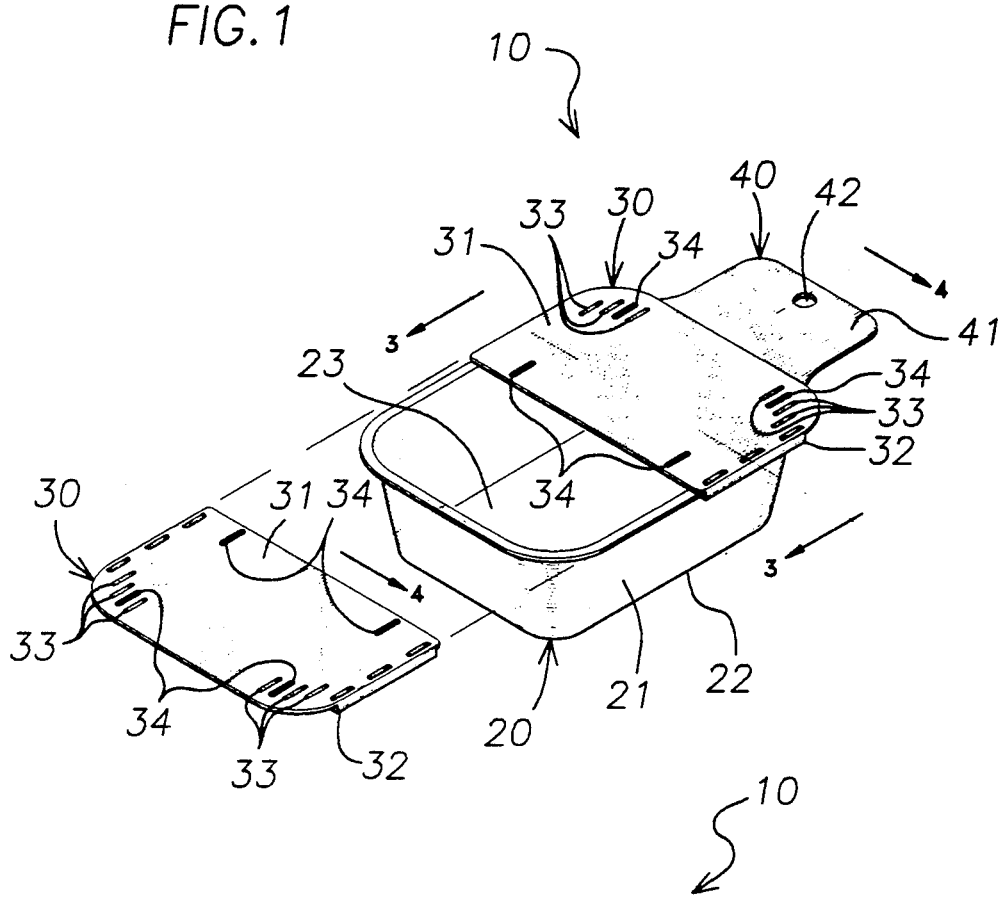
FIG. 1 is a perspective view of the preferred embodiment of the instant invention.

With reference to FIGS. 1-4, there is depicted stackable cookware generally characterized by the reference numeral 10, comprising a cooking container 20, lid halves 30 and a handle 40. In this embodiment, the cooking container 20 is a substantially rectangular enclosure having a bottom surface 22 that is integrally combined with tapered sidewalls 21. The sidewalls 21 diverge upwardly and outwardly from the bottom surface 22 to define an open top end having a peripheral ledge or lip 24 protruding therefrom.

In this embodiment, the lid is divided into two lid halves 30 having a planar surface 31, integrally formed sleeves 32, apertures 33, and locking channels 34. The lid halves 30 provide coverage for the container, wherein the sleeves 32 slide over the lip 24 at opposite ends of the container until each half meets, as seen in FIG. 1. Liquid may be drained or poured from the container 20 through the apertures 33 when the lid halves 30 are attached. The lid halves 30 also contain locking channels 34 to facilitate attachment to the legs 25 when stacking the cookware 10 for storage, packaging, or display. Each lid half 30 has a surface area slightly less than that of the exterior bottom surface 22 to facilitate attachment thereto and placement within the cavity of another unit.

Figure 2:
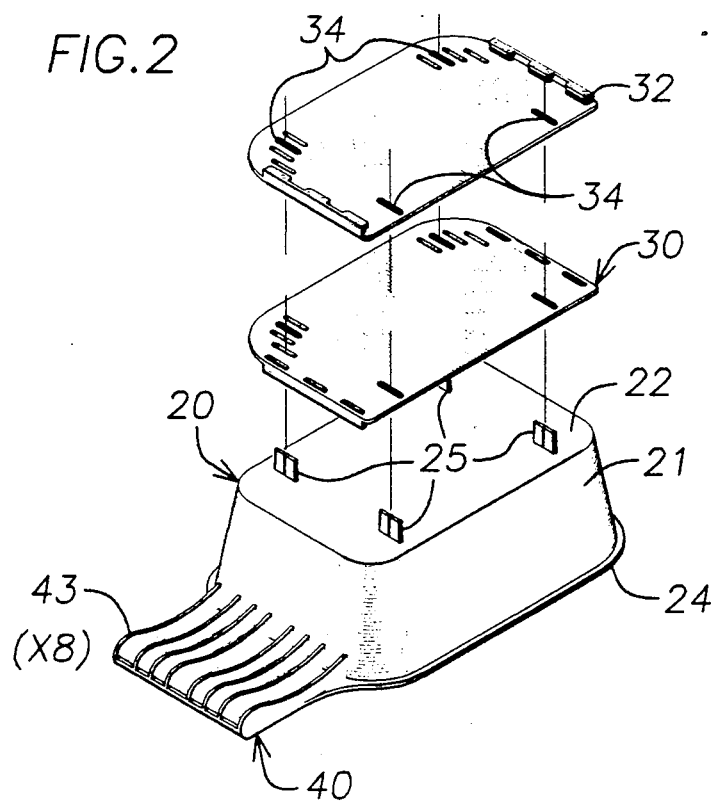
FIG. 2 is an inverted exploded view of the instant invention, illustrating the attachable lids.

Bottom surface 22 has stacking leg projections 25 pending from its exterior surface 22. The stacking legs 25 are tapered and positioned to align with the locking channels 34 when rotated 90°. When each lid half 30 is aligned with the exterior bottom surface 22, the stacking legs 25 interlock and mate with the locking channels 34 to firmly secure the lid halves 30, as illustrated in FIG. 2.

The handle 40 is comprised of a planar top surface 41, an aperture 42, and longitudinally disposed ribs 43 pending from the bottom of the handle 40. The handle's top surface 41 is flat to accommodate stacking, and the ribs 43 provide a firm grip and act as a heat sink to quickly cool the handle.

Figure 3:
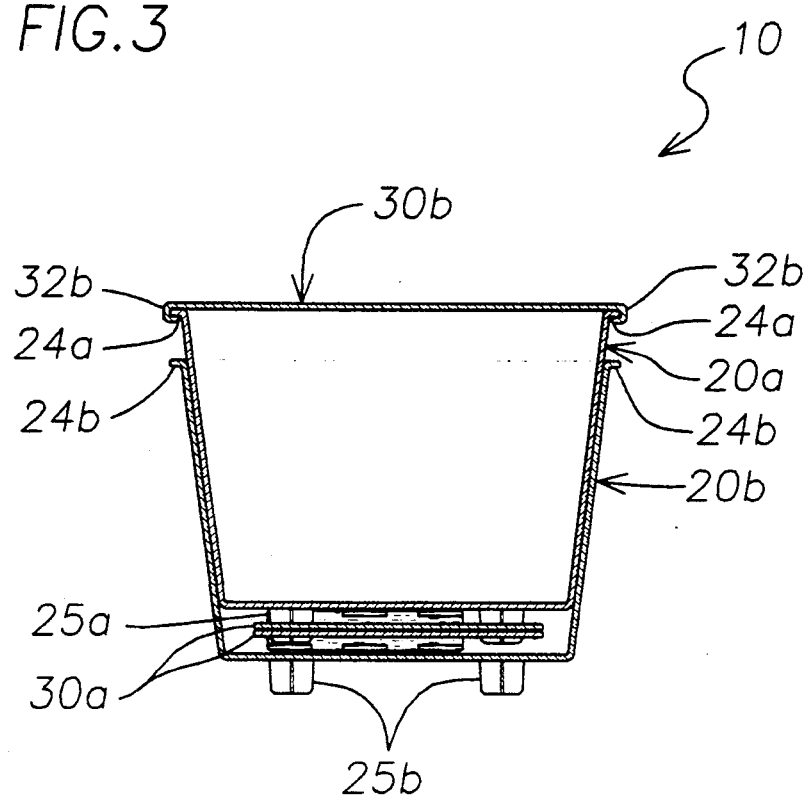
FIG. 3 is a cross sectional rear elevational view of the instant invention, illustrating the stacking feature.
Figure 4:
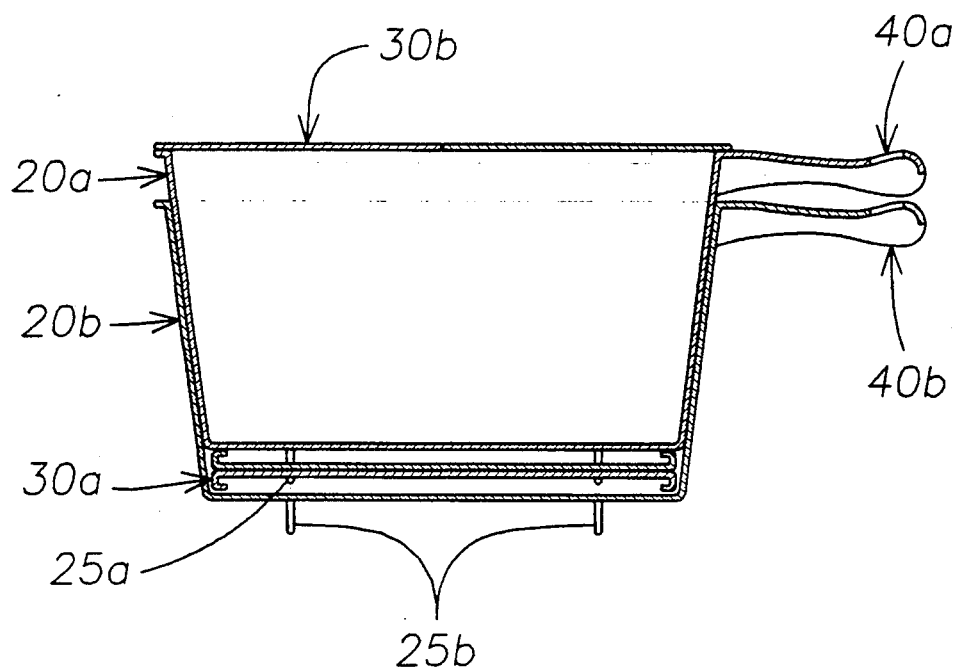
FIG. 4 is a cross sectional side elevational view of the instant invention, illustrating the stacking feature.

To utilize the instant invention for cooking, the lid halves 30 are mounted to the cooking container 20 by sliding them over the protruding lip 24. Subsequently, the cookware may be used with an oven or placed in a microwave and any excess liquid may be drained from the cooking container 20 by inverting the cookware unit 10. The lid halves 30 are similarly removed by sliding them off the lip 24 before serving and cleaning. To stack the cookware, as illustrated in FIGS. 3 and 4, the lid halves 30 are rotated 90°, the stacking legs 25 and locking channels 34 are aligned and mated, and the cookware unit 10 is placed within the cavity of another unit. Numerous vessels may be stacked in this manner. In addition to being suitable for stacking, the lid attachment feature of the cookware prevents lids from being lost at home or in stores.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A cooking apparatus having improved stacking capabilities with similarly shaped cooking apparatuses, said cooking apparatus allowing for compact shipping space when shipping more than one of said similar shaped cooking apparatuses, comprising:
    a first container for retaining food and liquids, said container having a bottom surface and a sidewall depending upwardly and tapering outwardly from the bottom surface, said sidewall having a top edge; said container shaped to easily receive a second container having a similar shape as said first container;
    a first lid member operatively associated with a first portion of the top edge of said sidewall and having a first plurality of apertures extending therethrough said first lid member being removable from the top edge of said sidewall;
    a second lid member operatively associated with a second portion of the top edge of said sidewall and having a second plurality of apertures extending therethrough, said second lid member being removable from the top edge of said sidewall; and
    means for storing said first lid member and said second lid member beneath said first container when said cooking apparatus is not in use.

2. The cooking apparatus of claim 1 further including a handle, operatively associated with said container, for holding said cooking apparatus, said handle having a top portion and a bottom portion.

3. The cooking apparatus of claim 1 wherein said means for storing said first lid member and said second lid member comprises a plurality of leg members depending downwardly from the bottom surface of said first container, said leg members being received within corresponding apertures of said first lid member and said second lid member to firmly retain said first lid member and said second lid member beneath said first container when said cooking apparatus is not in use.

4. The cooking apparatus of claim 1 wherein said first plurality of apertures allow for drainage of any undesirable liquid contents retained by said first container.

5. The cooking apparatus of claim 1 wherein said second plurality of apertures allow for drainage of any undesirable liquid contents retained by said first container.

6. The cooking apparatus of claim 1 wherein said first plurality of apertures allow for the release of steam from said first container.

7. The cooking apparatus of claim 1 wherein said second plurality of apertures allow for the release of steam from said first container.

8. The cooking apparatus of claim 1 wherein said cooking apparatus is microwavable.

9. The cooking apparatus of claim 2 wherein said handle having a plurality of ribs longitudinally disposed along and depending downward from the bottom portion of said handle.

10. The cooking apparatus of claim 3 wherein said leg members taper downwardly from the bottom surface to facilitate locking with the apertures of said first lid member and said second lid member.

11. A cooking apparatus having improved stacking capabilities with similarly shaped cooking apparatuses, said cooking apparatus allowing for compact shipping space when shipping more than one of said similar shaped cooking apparatuses, comprising:
- a container for retaining foods and liquids having a bottom surface and a sidewall depending upwardly and tapering outwardly from the bottom surface, said container having an open top end having a peripheral protruding lip;
- a plurality of leg members depending downwardly from the bottom surface; and
- a lid member having a first section and a second section operatively associated with the protruding lip, said first section and said second section each having a plurality of apertures for receiving said leg members in order to store said first section and said second section beneath said bottom surface when said cooking apparatus is not in use.

12. The cooking apparatus of claim 11 further including a handle, operatively associated with said container, for holding said cooking apparatus, said handle having a top portion and a bottom portion.

13. The cooking apparatus of claim 11 wherein said cooking apparatus is microwavable.

14. The cooking apparatus of claim 12 wherein said handle having a plurality of ribs longitudinally disposed along and depending downward from the bottom portion of said handle.

15. The cooking apparatus of claim 11 wherein said leg members taper downwardly from the bottom surface to facilitate locking with the apertures of said first lid section and said second lid section.

16. A cooking apparatus having improved stacking capabilities with similarly shaped cooking apparatuses, said cooking apparatus allowing for compact shipping space when shipping more than one of said similar shaped cooking apparatuses, comprising:
- a container for retaining foods and liquids having a bottom surface and a sidewall depending upwardly and tapering outwardly from the bottom surface, said container having an open top end having a peripheral lip forming a ledge which protrudes outwardly from the exterior of said sidewall;
- a plurality of legs tapering and depending downwardly from said bottom surface;
- a lid having a first lid member and second lid member together substantially covering the entire top end of said container, said first lid member and said second lid member each having a sleeve integrally formed therewith, and adaptable to the ledge formed at the peripheral lid of said container, said first lid member and said second lid member each having a plurality of apertures for receiving said plurality of legs for storing said first lid member and said second lid member beneath said container when said cooking apparatus is not in use; and
- a handle protruding outwardly from said container, said handle having a top portion and a bottom portion, said handle having a plurality of ribs longitudinally disposed along the bottom portion of said handle.

* * * * *